March 4, 1941.      R. S. BUCHANAN      2,233,514
DIRECTION SIGNAL LAMP FOR VEHICLES
Filed May 17, 1938

R. S. Buchanan
INVENTOR.
BY
ATTORNEYS.

Patented Mar. 4, 1941

2,233,514

UNITED STATES PATENT OFFICE 2,233,514

DIRECTION SIGNAL LAMP FOR VEHICLES

Royal S. Buchanan, Springfield, Mass.

Application May 17, 1938, Serial No. 208,481

1 Claim. (Cl. 177—329)

This invention relates to a direction signal lamp for use on motor vehicles, one of the objects being to provide a light, simple and compact device of this character adapted to be applied to and supported by either the windshield or the rear window of a vehicle where it will not obstruct the view of the driver, the construction of the lamp housing being such that the same may be readily cast or molded.

A further object is to provide signal lamps adapted to be used in pairs, the said lamps being controlled from a suitably located switch whereby either lamp may be lighted as desired.

Another object is to provide a direction signal lamp which is properly ventilated and which has a pilot opening by means of which the driver can determine readily whether or not the lamp is energized.

Another object is to provide a lamp housing which can be used either at the left side or the right side of the vehicle so that it is thus unnecessary to make "rights" and "lefts."

A further object is to provide a direction signal lamp the indicating portion of which is normally masked so as not to be visible unless the lamp in the housing is energized.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
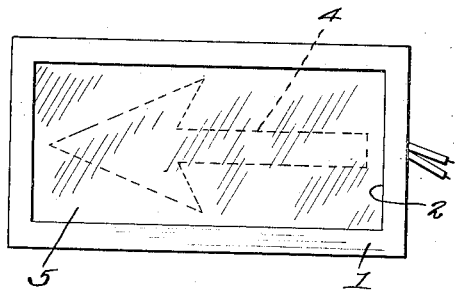
Figure 1 is an elevation of one side of the device.
Figure 4:
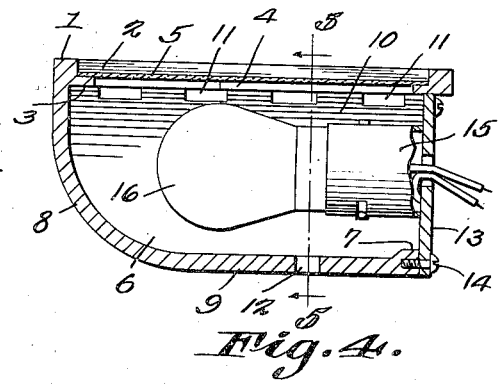
Figure 4 is a section on line 4—4, Figure 3.
Figure 2:
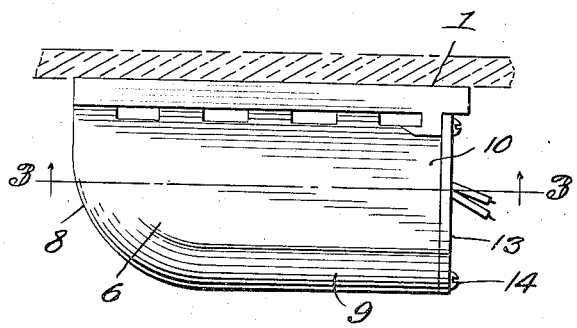
Figure 2 is a plan view thereof, the glass of the windshield or of the rear window of a vehicle being indicated in proper relation to the lamp housing.
Figure 5:
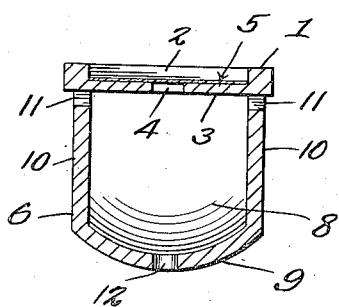
Figure 5 is a section on line 5—5, Figure 4, the lamp being removed.
Figure 3:
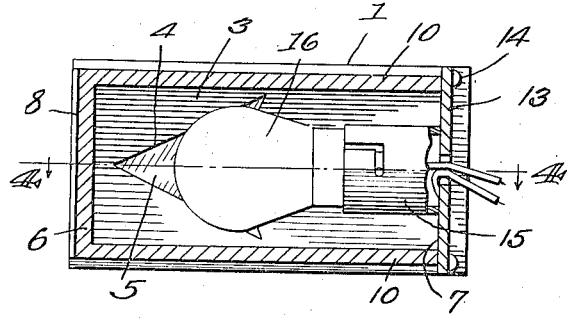
Figure 3 is a section on line 3—3, Figure 2.
Figure 6:
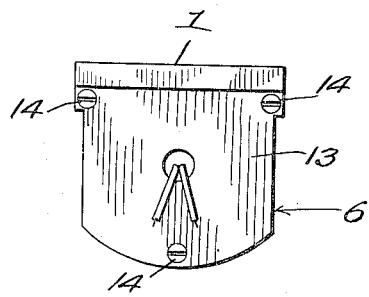
Figure 6 is an end elevation of the lamp housing.
Figure 7:
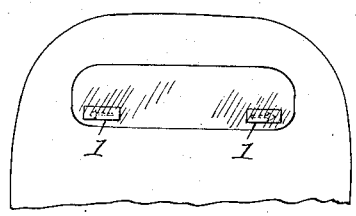
Figure 7 is a rear elevation of a portion of a vehicle and showing a pair of the signal devices applied to the rear window.

Referring to the figures by characters of reference 1 designates the flat base or side wall of the lamp housing which is provided with a recess 2 having an inner wall 3 provided with an opening 4 which, as shown in the drawing, can be in the shape of an arrow pointed toward one end of the housing. The recess 2 is adapted to receive a translucent mask 5 which, under normal conditions, conceals the opening 4. However when the interior of the housing is illuminated, the light rays passing through the opening, will appear within the mask so that the contour of the opening will thus be clearly depicted on the mask. The housing 6 of the lamp is open at one end as shown at 7 while the other end is rounded as at 8 and merges into the rounded back 9 which merges into the top and bottom walls 10 of the housing.

A desired number of ventilating openings 11 are formed in the top and bottom 10 close to the wall 3 and a pilot opening 12 is provided in the rounded back wall 9.

All of the parts thus far described, except the mask 5, are molded or cast in one piece of material. A suitable plastic can be used for this purpose or some metal, such as aluminum could be employed. In any event the inner surfaces of the walls 8, 9 and 10 could be of a light color so as to reflect light rays toward the opening 4.

The open end of the housing is adapted to be closed by an end plate 13 detachably fastened to the housing by screws 14 or the like. This plate carries a lamp socket 15 and it is intended to mount in the socket an incandescent lamp 16 of fifteen or twenty-one candle power.

It will be obvious that the end plate 3 with the lamp connected thereto and the mask 5 can both be readily placed in proper position.

It is intended to use these lamp housings in pairs ordinarily. If they are to be placed on a windshield, one is located on the glass of the windshield at the left thereof while the other is located at the right and in both cases the housings are arranged so that the arrows will point to the left and to the right respectively. The housings are joined to the windshield by placing a strong adhesive on the flat base 1 and then applying the same to the glass. If the housings are to be used on the rear window of a vehicle, they are placed one at the left side and the other at the right and both located where they will not obstruct the view of the driver. The wires leading to the lamps are coupled to a suitable switch located within convenient reach of the driver so that any lamp can be energized, as desired.

When a lamp at the left of the vehicle is lighted, the rays emanating therefrom will pass into the arrow-shaped slot 4 and form an illuminated arrow on the mask which can be seen readily by a person adjacent to the vehicle. This arrow will be pointed to the left and will indicate that the vehicle is about to make a left turn. As the lamp housings at the right of the vehicle are disposed oppositely to those at the left side, it will be apparent that when any one of those is lighted, the arrow will indicate a right-hand turn.

The intensity of the light within the arrow-shaped slot 4 is increased by providing the reflecting inner surfaces on the walls of the housing.

When a lamp is lighted, some of the light rays will be visible through the pilot opening 12. Thus the driver, by glancing at the housing, can determine whether or not the lamp is lighted. The openings 11 afford ample ventilation.

It is to be understood of course that these housings are all located inside of the vehicle where they will not be affected by moisture.

What is claimed is:

In a direction signal lamp a one-piece housing having a single, flat attaching base provided with an exterior mask-receiving recess and an aperture opening into the recess, the walls of the housing constituting reflectors merging along curved lines from one side to the other of the base and toward one end thereof thereby to provide arcuate reflecting surfaces, the housing being open at the other end of the base, an end plate for closing the open end of the housing, and a socket carried by said end plate and positioned to support a lamp in the housing adjacent to the base when the end plate is in place on the housing.

ROYAL S. BUCHANAN.